April 27, 1965   G. F. RITTER   3,180,780
GLASS PANEL STRUCTURE
Filed Aug. 29, 1958

INVENTOR.
George F. Ritter
BY
Nobbe & Swope
ATTORNEYS

United States Patent Office 3,180,780
Patented Apr. 27, 1965

3,180,780
GLASS PANEL STRUCTURE
George F. Ritter, Toledo, Ohio, assignor to Libbey-Owens-Ford Glass Company, Toledo, Ohio, a corporation of Ohio
Filed Aug. 29, 1958, Ser. No. 758,087
4 Claims. (Cl. 161—44)

The present invention relates broadly to glass building panels and more particularly to a panel structure incorporating a special patterned effect on a surface to overcome objectionable image distortion therefrom.

The panel structure of the invention is especially well adapted for use as a so-called spandrel or building type panel. Such panels and in particular those constructed of glass have come into rather extensive use in recent years as outside wall panels or facing structures for buildings. In fact, the word "spandrel" is quite commonly applied in the building art to all types of panels aside from glazing panels which are employed as wall facings in buildings. Interest has shifted the emphasis quite recently to glass panels and particularly to opaque colored glass panels.

Heretofore, glass panel structures of the above character were restricted to flat sheet-like structures due to the difficulties in obtaining satisfactorily tempered and properly distributed stress patterns within glass sheets of any shape other than substantially flat. It is, of course, obvious that wall facings in buildings of necessity must be tempered to provide a unit of suitable strength for construction purposes.

Additionally, besides severely restricting the number of ways in which the appearance may be improved or fashioned to individual tastes, smooth-surfaced glass panels unless provided with exactly plane parallel opposite surfaces present a disagreeable appearance in that they distort the reflected images of surrounding objects.

Even in the case of glass sheets that are ground to have parallel faces, the subsequent tempering operation destroys the parallel relationship sufficiently to produce the unwanted reflection distortion. Moreover, attempting to overcome this problem by tempering the glass sheets and then grinding the hardened sheets to a parallel condition would make the cost of such units prohibitive.

It is the primary object of this invention to provide novel commercially practicable glass panel structures for use as spandrels which structures have a patterned effect that eliminates this objectionable appearance of distortion.

In the drawings wherein like numerals may be employed to designate like parts throughout the same:

Figure 1:
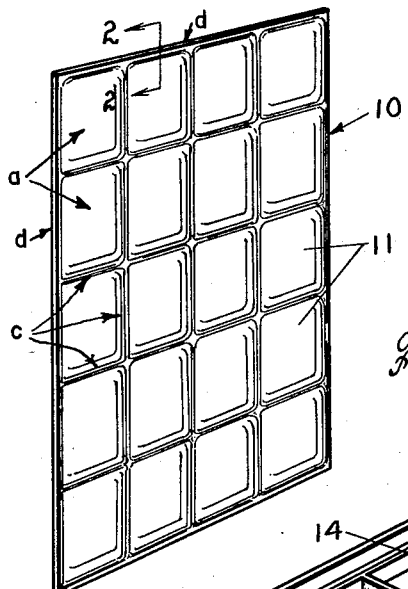
FIG. 1 is a perspective view of a building panel constructed in accordance with the invention.

With reference particularly to FIG. 1 there is illustrated a perspective view of a preferred form of glass panel structure 10 made according to the invention. This particular embodiment comprises a sheet of glass having an outwardly directed surface $a$ and an inwardly directed surface $b$ which is divided into a plurality of substantially rectangular cells 11 arranged on the glass in a symmetrical pattern. Each of these cells as is shown best in FIG. 2 has its outwardly directed surface convexly shaped and its corresponding inwardly directed surface concavely shaped. The cells are separated from each other by a web $c$ which is concave on the outwardly directing surface and convex on the inwardly directed surface. The marginal portion or rim $d$ of the panel is in a single plane which is coincident with the plane in which the inwardly directed surfaces of the convexly shaped web portions $c$ are disposed. Although the cells 11 are illustrated in FIG. 1 as being rectangular, they of course may be of any shape, geometric or non-geometric designs. The only important essential required in this regard is that the patterns be sufficiently symmetrical so that when a plurality of these panels 10 are incorporated in abutting relationship in a wall, they will give a pleasing appearance.

I have found that providing glass panels such as 10 having their surfaces broken up into a plurality of embossed areas destroys the objectionable distortion effect that is characteristic of flat parallel surfaced panels. This distortion is encountered in tempered flat surface glass panel structures whether they are made of transparent glass, or glass having a coloring additive mixed in with the batch of materials during manufacturing, or if the glass is colored by the addition of a coating of glass frit on one surface thereof.

It is preferred that the units used for construction panels in buildings are of the type in which any coloring desired is provided by applying a colored enamel or glass frit to one surface of the glass. In this type of unit the distortion is particularly noticeable and unpleasant and the removal of this distortion by itself considerably increases the esthetic qualities of a wall constructed of such panels.

Figure 2:
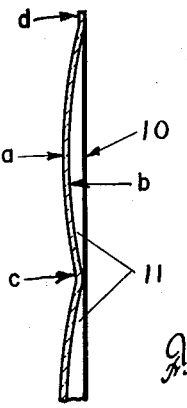
FIG. 2 is a fragmentary cross-sectional view of the novel building panel taken along line 2—2 of FIG. 1.
Figure 3:
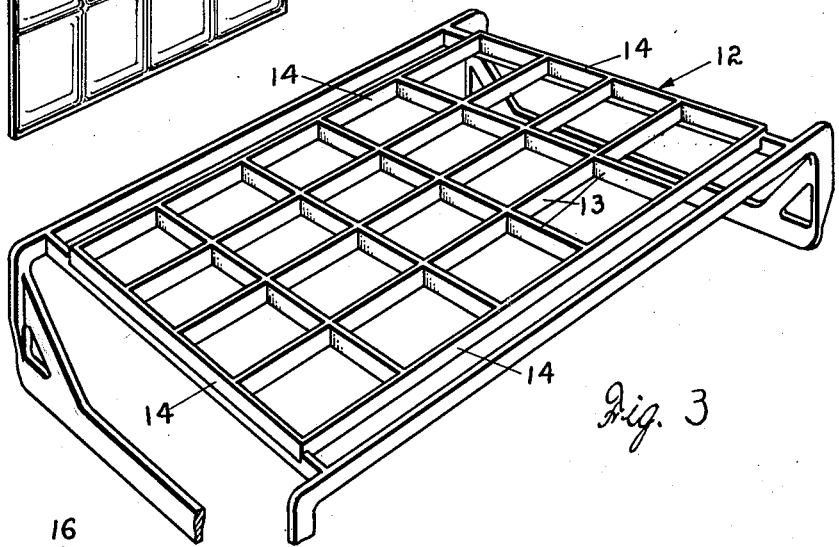
FIG. 3 is a perspective view of a mold for shaping the novel panel.
Figure 4:
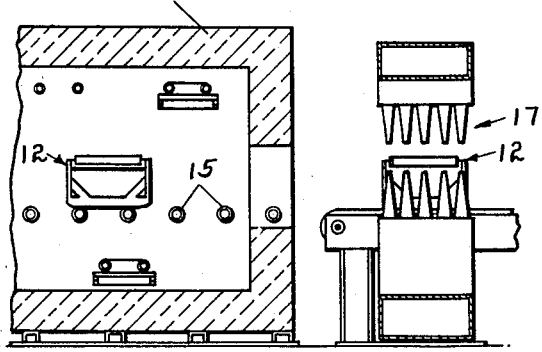
FIG. 4 is a sectional elevational view of a furnace and tempering device for producing the new building panel.

Turning to a detailed description of the manufacture of the novel panel, a horizontal glass sheet which has been provided with a layer of glass frit or enamel on its upper surface is positioned on a mold carriage 12 (FIGS. 2 and 3). This cart may comprise a plurality of spaced metal bars 13 arranged according to a predetermined desired configuration, having an upper surface for receiving the glass sheet maintained in one plane. In between the individual bars 13 there are provided spaces in which those portions of the glass sheet so disposed may sag giving an embossed or relief appearance to the panel surface.

Preferably, the outer bars 14 which form the periphery or edge of the panel 10 also have their upper or forming surfaces in a single plane coincident with the plane of the upper surfaces of the bars 13. Thus, a finished panel has a smooth flat rim which permits an easy mounting on a flat surface.

The loaded carriage is then placed on a conveyor system 15 for transportation into and through a bending furnace 16. In the furnace 16 the temperature of the glass is raised until the glass is pliable which temperature will vary from approximately 1150 to 1350° F. depending upon the composition of the glass sheet and its thickness. As the sheet is carried through the furnace at this temperature the unsupported portion of the sheet sags or deforms between the spacing bars 13 and simultaneously the glass frit fuses into a colored layer tightly adherent to the sheet surface.

The mold carrying the bent colored glass sheet is then removed from the furnace 16 and immediately passed between jets of cooling air from a suitable bellows 17 where the temperature of the glass is rapidly reduced for the purpose of tempering or hardening it to a state at which it will have sufficient strength to permit its utilization as a structure unit in a building.

Although the layer of colored glass frit is preferably applied to the sheet at the same time as the embossment of the sheet it, of course, may be applied in a separate step preceding the embossment.

The unit of the above character not only possesses the required strength for a structure panel and is available in any desired color to properly blend in with the surroundings or to conform to a particular color scheme, but also it is not subject to the heretofore encountered visual distortion of such units constructed with a flat or single plane surface.

I claim:
1. A glass construction panel, comprising a glass sheet of substantially uniform thickness, a plurality of concavo-convex areas formed in said sheet and regularly spaced across the sheet in a series of rows, relatively narrow web portions disposed in a common plane and joining said areas together, said areas having a greater width than said web portions, and a layer of coloring material fused to the surface of said sheet on the concave side of said areas.

2. A glass construction panel as defined in claim 1, in which the marginal edge portions of said sheet lie in said common plane.

3. A glass construction panel, comprising a glass sheet of substantially uniform thickness having relatively flat marginal edge portions and a plurality of regularly spaced concavo-convex areas formed in said sheet inwardly of said marginal edge portions and joined together in a series of rows by relatively narrow web portions lying in a common plane coincident with the marginal edge portions of said sheet, and a layer of colored material fused to one side of said sheet.

4. A glass construction panel comprising a tempered glass sheet of substantially uniform thickness having relatively flat marginal edge portions and a plurality of regularly spaced concavo-convex areas formed in said sheet inwardly of said marginal edge portions, the concavo-convex areas being joined together in a series of rows by web portions coplanar with said marginal edge portions, said concavo-convex areas having a substantially greater width than said connecting web portions, and a layer of colored material fused to one side of said tempered sheet.

References Cited by the Examiner
UNITED STATES PATENTS

| | | | |
|---|---|---|---|
| 615,479 | 12/98 | Dorpols | 117—5.5 |
| 632,008 | 8/99 | Dorpols | 49—84 |
| 643,223 | 2/00 | Dhe et al. | 49—67 |
| 1,041,329 | 10/12 | Mygatt | 49—92 |
| 2,202,714 | 5/40 | Nash | 154—2.2 |
| 2,248,714 | 7/41 | Lytle | 49—89 |
| 2,316,749 | 4/43 | Powers | 49—82 XR |
| 2,410,744 | 11/46 | Powers | 49—3 |
| 2,710,335 | 6/55 | Wong | 240—9 |
| 2,819,977 | 1/58 | De Paolis | 106—47 |
| 2,859,334 | 11/58 | Guth | 240—9 |
| 2,875,074 | 2/59 | Suchow | 106—47 |
| 3,012,477 | 12/61 | Lodge | 50—265 |

OTHER REFERENCES

Webster's Third New International Dictionary, page 912 (1963), published by G. & C. Merriam Co., Springfield, Mass.

EARL M. BERGERT, *Primary Examiner.*

BENJAMIN BENDETT, CHARLES R. HODGES, IVAN R. LADY, JOSEPH REBOLD, *Examiners.*